United States Patent
An et al.

(10) Patent No.: US 11,830,160 B2
(45) Date of Patent: Nov. 28, 2023

(54) OBJECT DETECTION USING PLANAR HOMOGRAPHY AND SELF-SUPERVISED SCENE STRUCTURE UNDERSTANDING

(71) Applicant: NVIDIA Corporation, Santa Clara, CA (US)

(72) Inventors: Le An, Santa Clara, CA (US); Yu-Te Cheng, Santa Clara, CA (US); Oliver Wilhelm Knieps, San Jose, CA (US); Su Inn Park, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 44 days.

(21) Appl. No.: 16/997,847

(22) Filed: Aug. 19, 2020

(65) Prior Publication Data
US 2021/0350150 A1    Nov. 11, 2021

Related U.S. Application Data

(60) Provisional application No. 63/020,527, filed on May 5, 2020.

(51) Int. Cl.
*G06T 3/00* (2006.01)
*G06N 3/04* (2023.01)
(Continued)

(52) U.S. Cl.
CPC ............ *G06T 3/0093* (2013.01); *B60R 11/04* (2013.01); *G06F 18/213* (2023.01);
(Continued)

(58) Field of Classification Search
CPC .... G06V 20/58; G06V 10/457; G06V 10/751; B60R 11/04; B60R 2011/0005;
(Continued)

(56) References Cited

U.S. PATENT DOCUMENTS 10,885,698 B2    1/2021  Muthler et al.
2016/0321074 A1  11/2016 Hung et al.
(Continued)

FOREIGN PATENT DOCUMENTS

WO   WO-2017201487 A1 * 11/2017 ............. G06F 17/16
WO   WO-2019099515 A1 *  5/2019 ......... G06K 9/00664

OTHER PUBLICATIONS

Conservative Control for Zone Driving of Autonomous Vehicles Using Safe Time of Arrival, U.S. Appl. No. 62/628,831, filed Feb. 9, 2018.
(Continued)

*Primary Examiner* — Utpal D Shah
(74) *Attorney, Agent, or Firm* — Davis Wright Tremaine LLP

(57) ABSTRACT

In various examples, a single camera is used to capture two images of a scene from different locations. A trained neural network, taking the two images as inputs, outputs a scene structure map that indicates a ratio of height and depth values for pixel locations associated with the images. This ratio may indicate the presence of an object above a surface (e.g., road surface) within the scene. Object detection then can be performed on non-zero values or regions within the scene structure map.

24 Claims, 17 Drawing Sheets

(51) Int. Cl.
| | |
|---|---|
| *G06N 3/08* | (2023.01) |
| *G06V 20/58* | (2022.01) |
| *B60R 11/04* | (2006.01) |
| *G06F 18/213* | (2023.01) |
| *G06F 18/214* | (2023.01) |
| *G06F 18/25* | (2023.01) |
| *H04N 23/54* | (2023.01) |
| *G06V 30/19* | (2022.01) |
| *B60R 11/00* | (2006.01) |

(52) U.S. Cl.
CPC .......... *G06F 18/214* (2023.01); *G06F 18/251* (2023.01); *G06N 3/04* (2013.01); *G06N 3/08* (2013.01); *G06V 20/58* (2022.01); *G06V 30/1902* (2022.01); *H04N 23/54* (2023.01); *B60R 2011/0005* (2013.01)

(58) Field of Classification Search
CPC .. G06K 9/6232; G06K 9/6256; G06K 9/6289; G06N 3/04; G06N 3/08; G06T 3/0093; H04N 5/2253
See application file for complete search history.

(56) References Cited

U.S. PATENT DOCUMENTS

| | | | | |
|---|---|---|---|---|
| 2018/0121273 | A1 | 5/2018 | Fortino et al. | |
| 2019/0080604 | A1* | 3/2019 | Yogamani | G08G 1/04 |
| 2019/0325595 | A1* | 10/2019 | Stein | G06T 7/248 |
| 2021/0134146 | A1* | 5/2021 | Meshram | G06V 20/52 |
| 2021/0383144 | A1* | 12/2021 | Price | G06V 10/40 |
| 2022/0092797 | A1* | 3/2022 | Song | G06V 20/54 |

OTHER PUBLICATIONS

Convolutional Neural Networks to Detect Drivable Freespace for Autonomous Vehicles U.S. Appl. No. 62/643,665, filed Mar. 15, 2018.
Deep Learning for Path Detection in Autonomous Vehicles , U.S. Appl. No. 62/684,328, filed Jun. 13, 2018.
Deep Neural Network for Estimating Depth from Stereo Using Semi?Supervised Learning, U.S. Appl. No. 62/646,148, filed Mar. 21, 2018.
Fischler et al., "Random Sample Consensus: A Paradigm for Model Fitting with Applications to Image Analysis and Automated Cartography," Communications of the ACM, 24(6): Jun. 1981, pp. 381-395.
Gao et al., "Obstacle Detection by Ground Homograph Estimation During Autonomous Navigation," Proc. SPIE 8003, MIPPR 2011: Automatic Target Recognition and Image Analysis, Dec. 8, 2011, 6 pages.
Gupta et al., "MergeNet: A Deep Net Architecture for Small Obstacle Discovery," 2018 IEEE International Conference on Robotics and Automation, Mar. 17, 2018, pp. 5856-5862.
Gupta et al., "Small Obstacle Detection using Stereo Vision for Autonomous Ground Vehicle," AIR '17: Proceedings of the Advances in Robotics, Jun. 2017, 7 pages.
Manduchi et al., "Obstacle Detection and Terrain Classification for Autonomous Off-Road Navigation," Autonomous Robots 18, 2005, pp. 81-102.
Method and System of Remote Operation of a Vehicle Using an Immersive Virtual Reality Environment, U.S. Appl. No. 62/648,493, filed Mar. 27, 2018.

Methodology of Using a Single Controller (ECU) for a Fault? Tolerant/Fail?Operational Self? Driving System, U.S. Appl. No. 62/524,283, filed Jun. 23, 2017.
Methods for accurate real?time object detection and for determining confidence of object detection suitable for autonomous vehicles U.S. Appl. No. 62/631,781, filed Feb. 18, 2018.
Methods for High-Precision, High-Accuracy Lane Detection in Autonomous Driving Applications, U.S. Appl. No. 62/699,669, filed Jul. 17, 2018.
Object Detection Using Image Alignment, U.S. Appl. No. 62/982,035, filed Feb. 26, 2020.
Pinggera et al., "Lost and Found: Detecting Small Road Hazards for Self-Driving Vehicles," 2016 IEEE/RSJ International Conference on Intelligent Robots and Systems, Sep. 15, 2016, pp. 1099-1106.
Pruning Convolutional Neural Networks for Autonomous Vehicles and Robotics, U.S. Appl. No. 62/630,445, filed Feb. 14, 2018.
Ramos et al., "Detecting Unexpected Obstacles for Self-Driving Cars: Fusing Deep Learning and Geometric Modeling," 2017 IEEE Intelligent Vehicles Symposium (IV), Dec. 20, 2016, pp. 1025-1032.
Rublee et al., "ORB: An Efficient Alternative to SIFT or SURF," 2011 International Conference on Computer Vision, 2011, pp. 2564-2571.
Shashua, "AI & Computer Vision Applied to Autonomous Driving," retrieved from Internet, from https://www.youtube.com/watch?v=URIrWETDO8U&feature=emb_logo, Jun. 2, 2019, 3 pages.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
System and Method for Autonomous Shuttles, Robo?Taxis, Ride? Sharing and On?Demand Vehicles, U.S. Appl. No. 62/635,503, filed Feb. 26, 2018.
System and Method for Controlling Autonomous Vehicles, U.S. Appl. No. 62/614,466, filed Jan. 7, 2018.
System and Method for Safe Operation of Autonomous Vehicles, U.S. Appl. No. 62/625,351, filed Feb. 2, 2018.
System and Method for Sharing Camera Data Between Primary and Backup Controllers in Autonomous Vehicle Systems, U.S. Appl. No. 62/629,822, filed Feb. 13, 2018.
System and Method for Training, Testing, Verifying, and Validating Autonomous and Semi? Autonomous Vehicles, U.S. Appl. No. 62/648,399, filed Mar. 27, 2018.
System and Methods for Advanced AI?Assisted Vehicles, United States U.S. Appl. No. 62/648,358, filed Mar. 26, 2018.
System and Methods for Virtualized Intrusion Detection and Prevent System in Autonomous Vehicles, U.S. Appl. No. 62/682,803, filed Jun. 8, 2018.
Systems and Methods for Safe and Reliable Autonomous Vehicles U.S. Appl. No. 62/584,549, filed Nov. 10, 2017.
Wulff et al., "Optical Flow in Mostly Rigid Scenes," 2017 IEEE Conference on Computer Vision and Pattern Recognition, 2017, pp. 6911-6920.
Xue et al., "A Novel Multi-Layer Framework for Tiny Obstacle Discovery," 2019 International Conference on Robotics and Automation, Apr. 23, 2019, pp. 2939-2945.

* cited by examiner

700B

800A

800B

OBJECT DETECTION USING PLANAR HOMOGRAPHY AND SELF-SUPERVISED SCENE STRUCTURE UNDERSTANDING

CROSS-REFERENCE TO RELATED APPLICATIONS

This application claims the benefit of U.S. Provisional Application No. 63/020,527, filed on May 5, 2020, which is hereby incorporated by reference in its entirety.

BACKGROUND

Embodiments of the present disclosure solve various problems involving computer vision and are applicable in a variety of contexts, such as obstacle detection on the road for autonomous driving vehicles. As an example, for human drivers, it is critical to identify potential road hazards on the ego lane and then take actions such as stopping or making a lane change in a timely manner to avoid accidents. Similarly, a self-driving vehicle is expected to have this ability to detect any potentially hazardous conditions on the road.

Embodiments described herein represent improvements over previous attempts to address the problem of detecting road hazards or other objects on a road surface:

SUMMARY

Embodiments of the present disclosure relate to object detection using planar homography and self-supervised understanding of scene structure. Systems and methods are disclosed that may utilize a single camera mounted on the front of a moving autonomous machine to capture images that are used to train a deep neural network (DNN) to predict a scene structure map. During a training phase, a planar homography between two image frames obtained from the camera at two distinct points in time is calculated and a first warped frame is generated based at least in part on the planar homography. The remaining difference between the first warped image and the second frame is modeled as a residual flow that is calculated based at least in part on the scene structure obtained as an output of the DNN using the two image frames as inputs. Finally, the residual flow is used to generate a second warped image based at least in part on the first warped image and the difference (e.g., photometric loss) between the second image and the second warped image may be used to update the parameters of the DNN.

During an implementation phase, two image frames—which may be captured at two distinct points in time—are provided as an input to the DNN, and the scene structure is determined. The scene structure includes a set of numerical values where a particular numerical value indicates a ratio of the height and depth for a particular pixel included in the two image frames. In various embodiments, non-zero values in the scene structure map indicate the presence of an obstacle above the road surface that may cause initiation of one or more obstacle detection algorithms.

In contrast to conventional systems discussed herein, embodiments of the present disclosure may detect road hazards with minimal sensors for simplicity and cost-effectiveness. For example, the systems and methods disclosed can operate effectively with a single image camera (e.g., a monocular camera) installed on a vehicle facing forward (e.g., a dashboard camera or other front-facing camera as described in greater detail below).

Some previous techniques, for example, use two images from a sequence as input, and iteratively processed to calculate ground homography based on feature matching and a consensus-based algorithm. Thereafter, hazardous objects are detected from the difference between the output from processing the images. This simple method may fail to work for complex scenes where a lot of feature points would be extracted from off-ground objects, thus adversely affecting planar homography estimation. In addition, extracting image features and performing iterative matching for each frame that—due in part to the timing requirements for iteration—may not be feasible for real-time deployment.

Other techniques leverage both low level image features such as image gradients and depth images from stereo cameras to segment out the obstacles by optimizing a Markov Random Field (MRF) model. This method is based on the assumption that areas around an obstacle exhibit high depth curvature, high depth variance, and high image gradients. Implementations of such a technique rely on stereo camera inputs and external depth estimation methods. In addition, this technique requires a deep neural network trained for road segmentation. The complexity and computational requirements of such a pipeline can be prohibitive and/or impractical for many applications.

BRIEF DESCRIPTION OF THE DRAWINGS

The present systems and methods for object detection using planar homography and self-supervised scene structure understanding are described in detail below with reference to the attached drawing figures, wherein.

DETAILED DESCRIPTION

Figure 1:
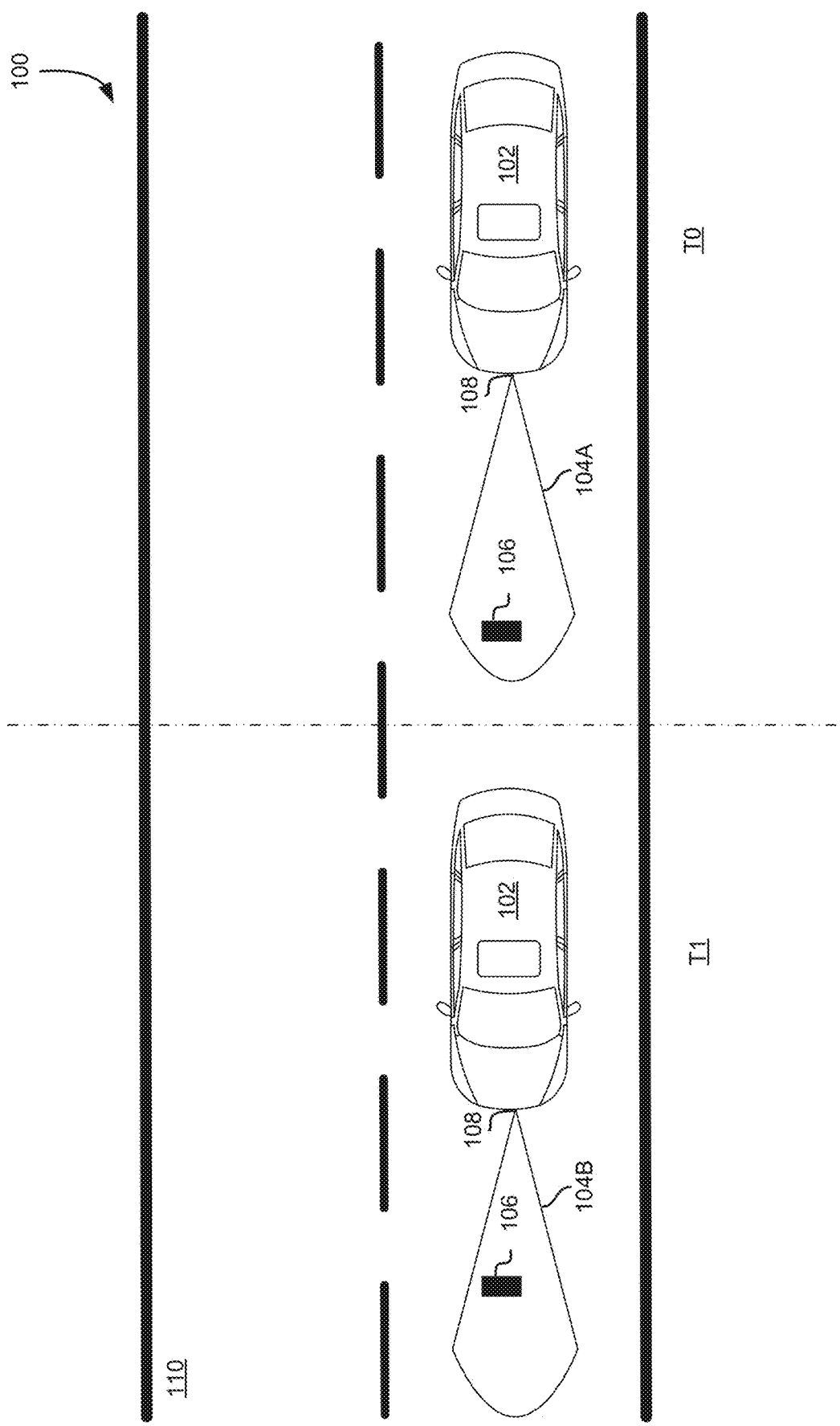
FIG. 1 is an illustration of an example single camera system used to detect an object on a road surface, in accordance with some embodiments of the present disclosure.

Systems and methods are disclosed related to object detection using planar homography and self-supervised scene structure understanding.

Object detection, including detection of potential obstacles, is an important feature for autonomous machines either with assisted driving functionality or fully autonomous driving capability. Embodiments of the present disclosure provide a camera-based approach to object detection using both computer vision and deep learning techniques. In addition, this solution can be accomplished with minimal sensor settings and computational requirements for its simplicity and cost-effectiveness. Specifically, the proposed methods and systems can detect an object above a road surface with only a single image camera (e.g., a monocular camera) installed on a moving vehicle such as a dash cam or similar front facing camera.

In various approaches, autonomous machines may utilize inputs from multimodal sensors such as camera, radar, and/or lidar when performing various operations (e.g., detecting obstacles on a road service). However, the use of additional inputs requires additional cost both in the need for additional hardware and additional computational requirements to process these additional inputs. In various embodiments described in the present disclosure, detecting obstacles on the road is performed using a minimal setup of sensor systems and computational intensity. For example, the systems and methods described herein can be used on deployments featuring only a single front-facing camera mounted on a moving vehicle or robot. While these systems and methods are not limited as such, including advanced sensors such as lidar may not be as cost-effective, and greatly increases the system complexity that prohibits large-scale deployment in the near future.

Moreover, a supervised learning approach will be difficult to scale and generalize as labeled data for road obstacles is scarce and it is impossible to enumerate all possible kinds of obstacles on the road. In addition, manually labeling a large corpus of data for training neural networks will be very expensive.

Embodiments of the systems and methods described herein use a single camera mounted on a moving vehicle or robot to capture images of the environment surrounding the vehicle. During an example training phase, two image frames from the camera are using as an input to train a deep neural network (DNN). In one example, the DNN is then used by one or more computer systems within the vehicle or robot to predict a scene structure map, which has the same size as the input images. In this structure map, in an embodiment, is a matrix of a numerical values, determined based at least in part on a ratio between height and depth predicted for a particular pixel location. Using a road segmentation or lane detection algorithm (which can be based on current techniques), points on the road with non-zero value in the structure map might be an obstacle. In various embodiments, a bounding box may then be determined that encloses the obstacle. Conventional techniques such as thresholding and connected component analysis, in various embodiments, is applied to generate the bounding box. In the example described above, the DNN may perform unsupervised or self-supervised learning. However, in various other embodiments, supervised learning may be used to improve accuracy (e.g., to predict height and depth for objects on the road surface). For example, additional sensor data, such as lidar data, can be used to perform supervised learning of the DNN.

The proposed systems and methods can be included as an essential component in existing self-driving vehicle software to ensure safe operations at all levels of autonomous driving systems. In addition, the application of these techniques in single camera systems provides cost savings (e.g., sensor costs and computational costs) and lowers the requirements for enabling self-driving vehicles. Another specific merit of the proposed method is that due to the nature of self-supervised learning, a lot of effort can be saved from data labeling, which would greatly expedite the development process and reduce cost. In addition, other application domains, such as robotics, can utilize this method, for example to navigate robots away from or around obstacles.

With reference to FIG. 1, FIG. 1 is an example of a vehicle 102 with a single front mounted camera 108 that uses a trained DNN to detect an object 106 on a road surface 110, in accordance with some embodiments of the present disclosure. Furthermore, the camera 108 as described in greater detail below, is used to capture images of a scene that can be used to train the DNN and/or provided as an input to the DNN to detect objects on a road surface. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

FIG. 1 illustrates two scenes T0 and T1, where T0 illustrates a first point in time at which a first image 104A of the scene is captured and T1 illustrates a second point in time at which a second image 104B is captured. According to one or more embodiments, implementations can either use two (or more) consecutive frames, or two (or more) frames apart by a time gap (e.g., 0.2 second). For example, the first image 104A is adjacent to the second image 104B in a video captured by the camera 108. In another example, the first image 104A and the second image 104B are captured by the camera 108 but are separated by an interval of time such as 0.2 second. In various embodiments, the interval of time between the first image 104A and the second image 104B may be modified based at least in part on data obtained from inertial measurement unit (IMU) sensor(s), described in greater detail below, of the vehicle 102. For example, the interval between capturing the first image 104A and the second image 104B may be increased or decreased based at least in part on a velocity of the vehicle. In yet another example, the capturing of images may be temporarily paused, increased, or decreased if a steering angle of the vehicle exceeds a threshold value (e.g., 30%).

In various embodiments, the first image 104A and the second image 104B (or additional images as volumetric image data as described in greater detail below) contain information of almost the same scene but from a slightly different view, and therefore a three dimensional structure of the scene, such as depth and height at each pixel location, can be inferred from the frame difference. Described below is a two-phase process comprising a training phase and a deployment phase to utilize the DNN to detect objects on a road surface using the first image 104A and the second image 104B.

During an example training phase, described in greater detail below in connection with FIGS. 2 and 3, a DNN or similar algorithm may be trained to predict an object in the road using the first image 104A and the second image 104B as inputs. In other embodiments, multiple images and/or data (e.g., sensor data) may be provided as inputs to the DNN. During the training phase a corpus of training images may be used to train the DNN. In addition, the camera 108 may capture a plurality of images and/or video that may be used as training data in addition to or as an alternative to the corpus of training images. Using the first image 104A and/or the second image 104B as an example, during the training phase, a road segmentation and/or lane detection algorithm may be applied to the images to identify an approximate region of road in the first image 104A and/or the second image 104B.

In addition, these algorithms and other suitable algorithms, in various embodiments, are used to perform feature extraction on the images used to train the DNN (e.g., the first image 104A and the second image 104B). Extracting the features from the road regions in the training images enables feature matching based homography in which, for example, the first image 104A is warped to the second image 104B to generate a warped image. As described in greater detail below in connection with FIG. 3, the warped images generated as a result of this homography are further warped using a residual flow map (e.g., a vector) calculated based at least in part on a scene structure map outputted by the DNN.

In various embodiments, random sample consensus (RANSAC) or a similar algorithm is used to estimate the homography transformation (e.g., 3×3 matrix) such that the correspondence can be established between keypoints detected on the road surface using feature extractors such as speeded up robust features (SURF), robust independent elementary features (BRIEF), Oriented FAST and Rotated BRIEF (ORB), and scale-invariant feature transform (SIFT). This is referred to as planar homography. In yet other embodiments where additional information is known about the camera 108 or camera(s) within the vehicle 110 (e.g., camera pose or other camera parameters), an estimation of the homography transformation is not needed because the correspondence between the image coordinates and the real world coordinates can be determined from the camera pose or other camera parameters.

Returning to the example in FIG. 1, planar homography is used to warp the first image 104A towards the second image 104B. In the warped image—generated as a result of the planar homography—anything (e.g., the object 106) not on the plane (e.g., the road surface identified using the algorithms described above) will not be aligned to the corresponding points in the second image 104B. Based at least in part on this warped image, the remaining difference between the warped image and the second image 104B can be modeled by a residual flow, which is determined based at least in part on a height of a particular point (e.g., a pixel in the image representing the object 106) above the plane. Furthermore, while planes are used as an illustrative example, the techniques can be applied to other surfaces. For example, curved surfaces (e.g., hills, banks, potholes, curbs, ramps, etc.) that are convexly, or concavely, or otherwise curved in the direction of the vehicle's travel, (the same in other directions, etc.). In various embodiments, during the training phase, the residual flow is calculated based at least in part on the scene structure that the DNN outputs. Returning to the example above, the scene structure map is generated by the DNN taking the first image 104A and the second image 104B as inputs. As described in greater detail below, the scene structure map is a matrix that represents ratio between the height and depth at pixel locations within the images.

In various embodiments, during the training of the DNN, the inputs of DNN are the first image 104A and the second image 104B, the output of DNN is the scene structure map which is converted to the residual flow map (for example, using known techniques). The residual flow may then be used to further warp the warped image (e.g., the image as described above generated by warping the first image 104A to the second image 104B) towards the second image 104B, resulting in a second warped image. In various embodiments, the purpose of the residual flow is to align the points above the plane (e.g., the road surface 110). Just as the planar homography aligns points of the road 110 surface in FIG. 1, the residual flow can be used to align points of the object 106.

In general, the closer the second warped image (e.g., the result of warping the warped image, described above, towards the second image 104B) is to the second image 104B, the more accurate the residual flow is, and therefore the more accurate the scene structure is. As a result, the photometric loss between the second warped image (e.g., a multi-warped image generated by at least warping the first warped image) and the second image 104B (e.g., the difference between the images) can be used to update the parameters of the DNN during training. During the deployment phase, the DNN generates the scene structure map, for example based at least in part on the first image 104A and the second image 104B, planar homography and residual flow may not be calculated, and the parameters of the DNN may not be adjusted.

Furthermore, the DNN or other suitable networks may be trained to take any number of images and/or sensor data as an input. Non-limiting examples include two (or more) images from a single camera taken one second apart, non-consecutive images from a video feed from a single camera, or even fours images captured by two cameras at two points in time. The systems and methods described in the present disclosure are flexible and, in various embodiments, can perform object detection using just two images from a single camera. As described in the present disclosure, the DNN then predicts the scene structure map from the two images. The DNN can be trained to use any image-based input formats. Furthermore, the images may include grayscale images or color images in all kinds of color spaces such as RGB and YUV.

In addition to being able to use multiple images to generate the scene structure map, during an example training phase, multiple images (e.g. 30 frames captured during one second) may be used as an input to the DNN. For example, given a sequence of images, (e.g. image 1, image 2, ..., image 30), multiple combinations of images (e.g., image 1 and image 2, image 1 and image 30, image 2 and image 30, ...) may be used to compute homography and photometric loss, as described above. In another example, the entire sequence of images (e.g., the 30 images), may be stacked as a volume (e.g., volumetric data) comprising image 1, image 2, ..., image 30 and used as an input to the DNN. In such examples, the additional images can provide more fine-grained information and scene details to facilitate improved performance by the DNN.

In various embodiments, during the deployment phase the first image 104A and the second image 104B are used as inputs into the DNN, which detects the object 106 above the road surface 110 using the information (e.g., the ratio between height and depth) in the scene structure map. As described in greater detail below in connection with FIG. 4, when performing hazard detection, the non-zero locations within the road region of the scene structure map may be identified. These non-zero locations indicate that a height above the road 110 is non-zero, and thus indicates that an object 106 (e.g., debris) is on the road 110. The system executing the DNN or other system may generate bounding boxes that enclose these non-zero regions, using standard image processing techniques (e.g., thresholding, dilation/erosion, connected component analysis, or any other suitable image processing algorithm).

With a trained DNN and using the techniques described in the present disclosure, accurate scene structure maps may be generated from just two images obtained from the camera 108 on the vehicle 102 while in motion. In various embodiments, any regions corresponding to non-zero values in the scene structure map will be regarded as potential obstacles. Furthermore, the DNN may operate in a self-supervised learning or an unsupervised learning manner, without the necessity of any human-labeling of particular shape, type, or location of an obstacle.

Finally, although a vehicle 102 with a single camera 108 is shown in FIG. 1, note that the proposed approach can be easily extended to use multiple image frames to better capture the scene structure. In addition, images from multiple cameras (e.g., a stereo camera) can provide additional visual cues of the same scene, thus leading to better accuracy. Furthermore, while the systems and methods described use a DNN, other network models may be used. For example, the DNN described above takes two or more images as an input, and output is a scene structure map (which may be generated as an image). As a result, any fully convolutional network or convolutional network that yields image-shaped outputs can be utilized in connection with any of the embodiments described in the present disclosure. Non-limiting examples of suitable networks include: U-Net, DeeplabV3+, DeeplabV3, SegNet, and FCN. Note that in general, any network suitable for semantic segmentation can be used.

The systems and methods described in the present disclosure may also be used in additional applications. As an example, the non-limiting application of the present disclosure is directed to depth estimation, height estimation, off-ground object detection, off-ground object segmentation, robotics-related applications, navigation, or other image processing and computer vision applications. In general, the neural networks described predict a scene structure that contains more fundamental geometric information of a real-world scene; therefore, the neural networks are applicable to an application where estimation and/or prediction of real-world geometric information of a scene is used.

Embodiments of the present disclosure provide a novel approach for using self-supervised learning for obstacle detection with a single camera; the adoption of a DNN—as compared to conventional computer vision and image processing based methods—can model complex patterns in real-world data; the self-learning mechanisms according to embodiments of the present disclosure, and also avoids expensive human data labeling as compared to supervised learning. Instead, large volumes of unlabeled data, which are easily accessible, can be used to improve the accuracy of computed predictions. Furthermore, the systems and methods described herein do not require any prior knowledge on depth or disparity. In various embodiments, only color images are needed as inputs during the deployment phase.

Now referring to FIGS. 2, 3, 4, and 5, each block of methods 200, 300, 400, and 500 described herein, comprises a computing process that may be performed using any combination of hardware, firmware, and/or software. For instance, various functions may be carried out by a processor executing instructions stored in memory. Each of the methods may also be embodied as computer-usable instructions stored on computer storage media. The methods may be provided by a standalone application, a service or hosted service (standalone or in combination with another hosted service), or a plug-in to another product, to name a few. In addition, method 200 is described, by way of example, with respect to the object detection system of FIG. 1. However, these methods may additionally or alternatively be executed by any one system, or any combination of systems, including, but not limited to, those described herein.

Figure 2:
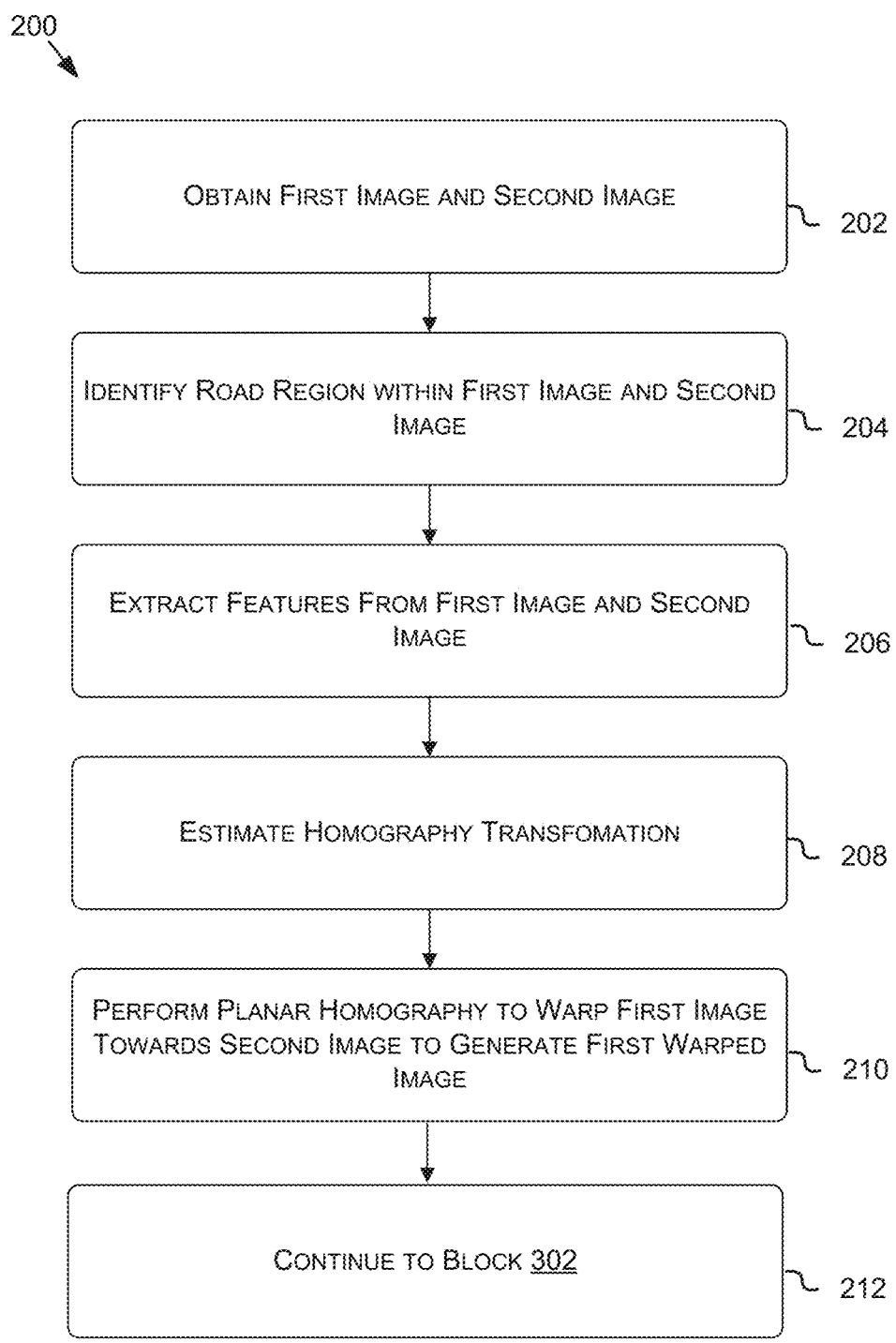
FIG. 2 is an example process of generating a warped image for use in a training process, in accordance with some embodiments of the present disclosure.

FIG. 2 is a flow diagram showing a method 200 for generating a warped image used during a training phase on a DNN, in accordance with some embodiments of the present disclosure. The method 200, at block 202, includes obtaining a first image and a second image. As described above, the images may be obtained from a single camera mounted on a vehicle (e.g., a dash camera). In an embodiment, the images are adjacent images in a video stream. In yet other embodiments, there is a temporal displacement (e.g., 0.2 second) between the images. This temporal displacement may be modified based at least in part on information about the movement of the camera or the vehicle to which the camera is affixed (e.g., velocity, Global Positioning System (GPS) coordinates, steering angle, etc.). Furthermore, as described above, method 200 may be modified to include volumetric data such as additional images and/or sensor data.

At block 204, the system executing method 200 identifies a road region within the first and second images. As described above, road segmentation, free space estimation, and/or lane detection algorithm may be used to identify the road region. The road region is identified in order to detect an object above the road surface. At block 206, the system executing method 200 detects keypoints and extracts keypoint features from the first and second images. For example, ORB or a similar algorithm, may be used to detect keypoints and extract features from the images. The features and corresponding keypoints extracted from the images, as described below, allow for estimation of planar homography and the determination of the plane associated with the road.

At block 208, the system executing method 200 estimates a homography transformation to warp the first image to the second image. In various embodiments, RANSAC is used to estimate the homography transformation based at least in part on information obtained from the images. For example, the planar homography is based at least in part on feature matching and consensus from pre-segmented road surfaces in the first and second images. The system executing the method 200 does not require precise isolation of road regions from the scene. Moreover, the operations described in connection with FIG. 2 are performed during the training phase, are not required for the deployment phase, and do not impose computation burdens during the deployment phase.

As a result of performing direct homography estimation via keypoint matching and/or feature extraction, information on calibration of cameras (e.g., camera pose) is not required, and coordinates conversion such as from an image plane to world coordinates is bypassed. This significantly reduces system complexity. In embodiments where camera calibration is readily available and reliable, method 200 can be modified to utilize camera pose to calculate homography, instead of performing procedures as described above at blocks 206 and 208.

At block 210, the system executing method 200 uses the estimated homography transformation to perform planar homography in order to warp the first image towards the second image and generate a first warped image. At block 212, processing of the images and generation of the warp image is completed and training of the DNN continues at block 302 of FIG. 3. In various embodiments, the operations described in FIG. 2 may be omitted, performed in different orders, performed in parallel, or a combination of serial and parallel. Regarding the processing of inputs (e.g., the processing of the images described in connection with FIG. 2), transformations such as mean subtraction, standard deviation normalization as well as pre-processing of inputs for better results, such as image denoising, can be selectively chosen.

Figure 3:
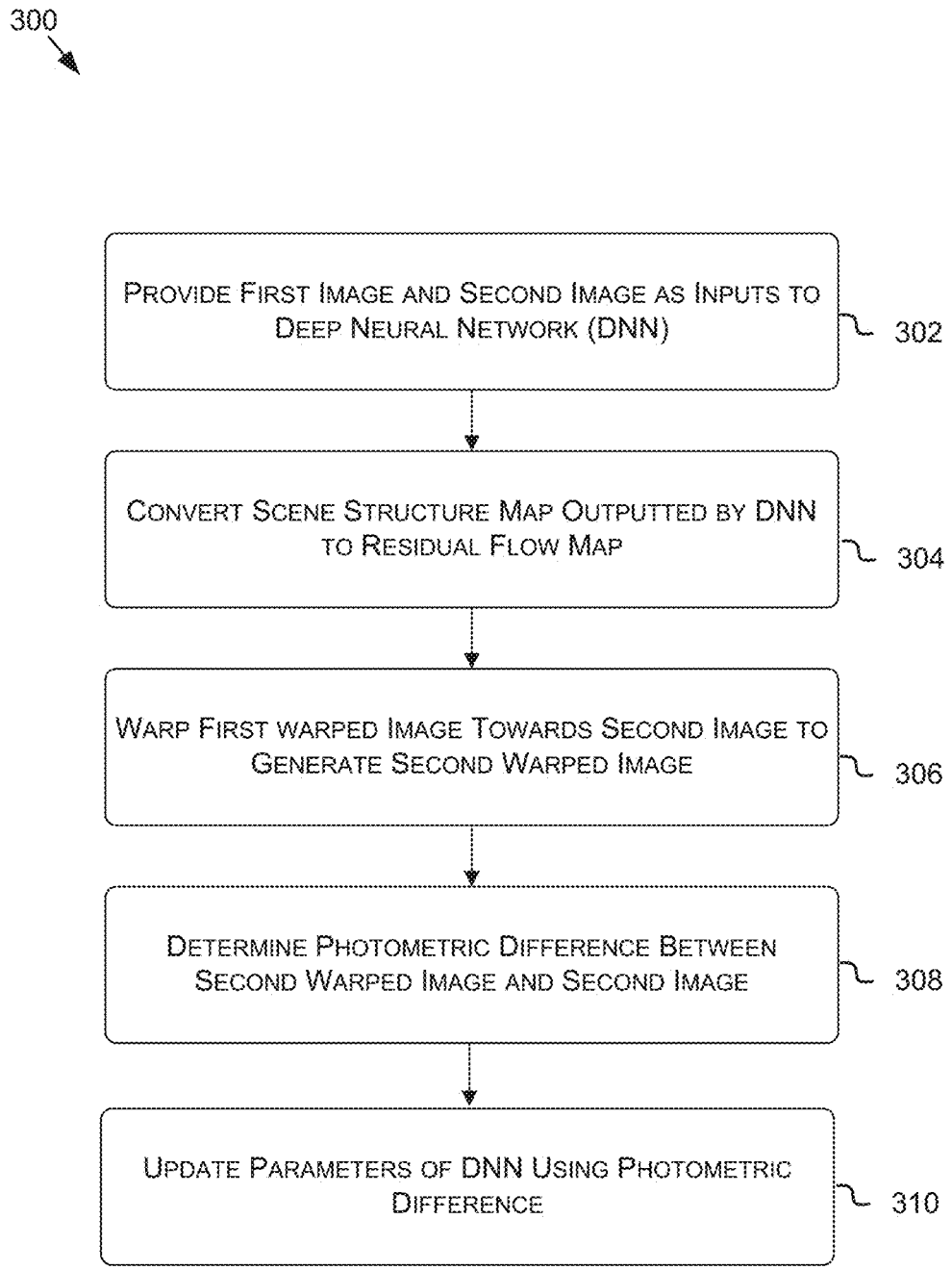
FIG. 3 is an example process of training a model used by the example single camera system of FIG. 1, in accordance with some embodiments of the present disclosure.

FIG. 3 is a flow diagram showing a method 300 for training a DNN to detect an object on a road surface, in accordance with some embodiments of the present disclosure. The method 300, at block 302, includes providing a first image and a second image as inputs to a DNN. Method 300, in various embodiments, may be part of a large training phase to prepare the DNN for deployment. The computer vision and image processing operations described in connection with FIG. 2 generate data (e.g., the warped image) that may be used in connection with the method 300. As described above, the DNN outputs a scene structure map based at least in part on the first image and the second image.

At block 304, the system executing method 300 converts the scene structure map outputted by DDN to a residual flow map. In various embodiments, the residual flow may be modeled as a vector that can be used to further warp the warped image generated using the planar homography described in FIG. 2 towards the second image. Determination of the residual flow may be performed using known computer vision and pattern recognition techniques. At block 306, the first warped image (e.g., the warped image generated at block 210 of the method 200) is further warped towards the second image based at least in part on the residual flow to generate a second warped image. In various embodiments, the planar homography described above aligns the road surface between the first and second image, whereas warping the image further at block 306 of method 300 aligns objects above the road surface.

At block 308, the system executing method 300 determines the photometric difference between the second warped image and the second image. The photometric difference and/or photometric loss measures the difference between an input image (e.g., the second image) and a warped image (e.g., the second warped image generated at block 306) based on the predicted optical flow by the DNN. At block 310, the system executing method 300 may update the parameters of the DNN based at least in part on the photometric difference determined at block 308.

Furthermore each of method 200 and method 300, in various embodiments, can be generalized to different settings, e.g. multiple input frames, multiple camera inputs, multiple additional sensors, etc. In addition, the design of the DNN can be aligned with state-of-the-art techniques to further address accuracy or latency requirements.

Figure 4:
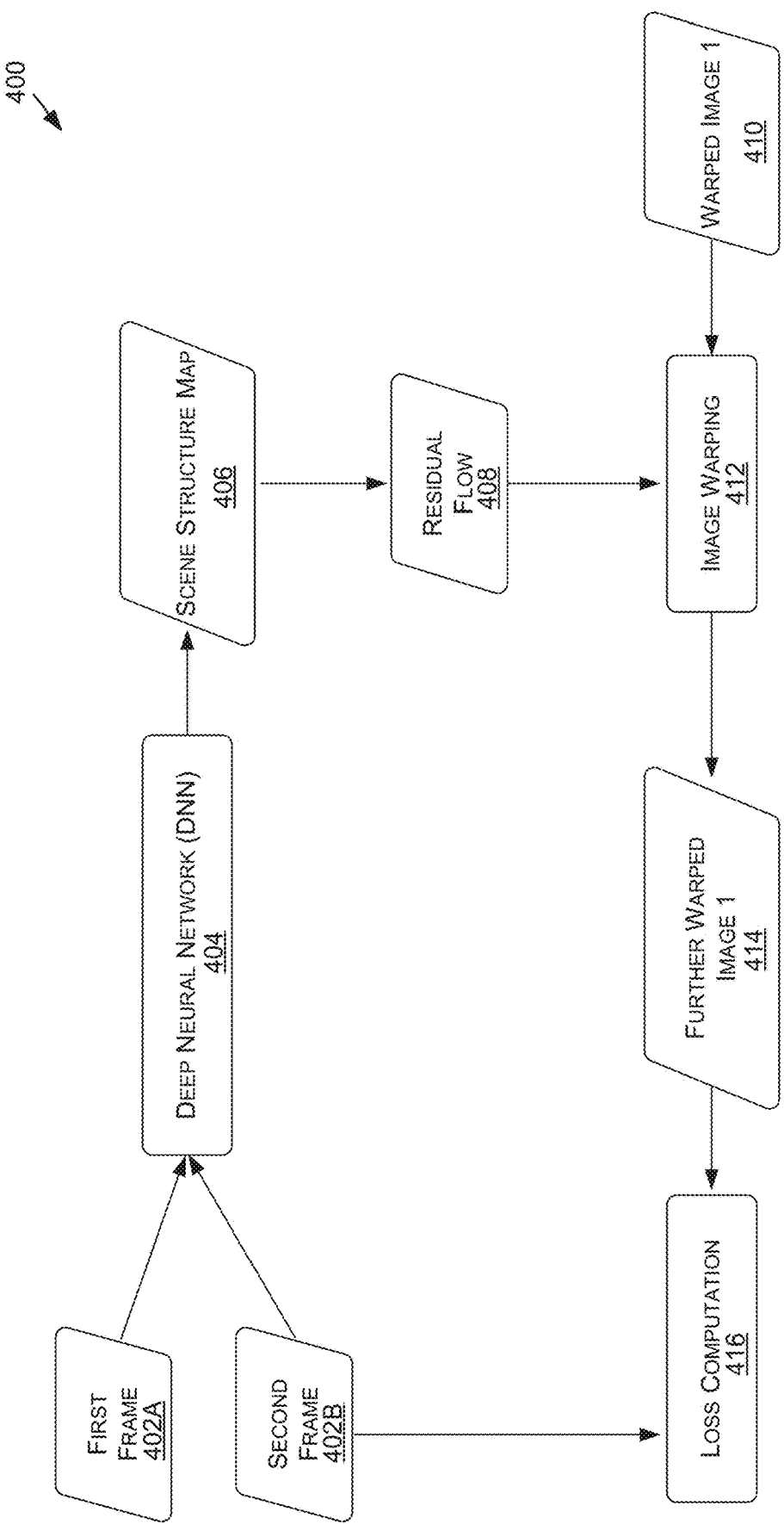
FIG. 4 is an example process of generating a warped image for use in a training process and training a model used by the example single camera system of FIG. 1, in accordance with some embodiments of the present disclosure.

FIG. 4 is a flow diagram showing a method 400 for generating a warped image used during a training phase on a DNN and training the DNN to detect an object on a road surface, in accordance with some embodiments of the present disclosure. The method 400, at block 402A and 402B, includes obtaining a first image frame and a second image frame. As described above, the images may be obtained from a single camera mounted on a vehicle (e.g., a dash camera). In an embodiment, the images are adjacent images in a video stream. In yet other embodiments, there may be a temporal displacement (e.g., 0.2 second) between the images. This temporal displacement may be modified based at least in part on information about the movement of the camera or the vehicle to which the camera is affixed (e.g., velocity, Global Positioning System (GPS) coordinates, steering angle, etc.). Furthermore, as described above, the method 400 may be modified to include volumetric data such as additional images and/or sensor data.

The method 400, at block 404, includes providing the first image frame 402A and the second image frame 402B as inputs to a DNN. The computer vision and image processing operations described in connection with FIG. 2 generate data, for example, the warped image 410 described in greater detail below. As described above, the DNN outputs a scene structure map 406 based at least in part on the first image frame 402A and the second image frame 402B. In various embodiments, the scene structure map 406 includes images and data described in the present disclosure, for example, as described in connection with FIG. 5 below.

At block 408, the system executing method 400 converts the scene structure map 406 to a residual flow map given the calibrated camera height and the estimated homography. In various embodiments, the residual flow 408 may be modeled as a vector that can be used to further warp the warped image 1 410 generated using the planar homography described in FIG. 2 towards the second image. Determination of the residual flow, in various embodiments, is performed using known computer vision and pattern recognition techniques.

At block 412, the system executing process 400, utilizes the residual flow 408 to further warp the warped image 1 410 towards the second image frame 2 402B. In various embodiments, warping the warped image 1 410 is performed using the residual flow 408. The residual flow 408 provides information associated with objects above the road surface that is used to warp objects above the road surface in the warped image 1 410 towards objects above the road surface in the second image frame 402B. The image warping that occurs in block 412, generates a further warped image 1 414. As described above, the further warped image 1 414 is an image generated as a result of warping the warped image 1 410 towards the second image frame 402B.

At block 416, the system executing the method 400 determines the photometric difference (e.g., loss computation) between the further warped image 1 414 and the second image frame 402B. The photometric difference and/or photometric loss measures the difference between an input image (e.g., the second image frame 402B) and a warped image (e.g., the further warped image 1 414) based on the predicted optical flow by the DNN.

Figure 5:
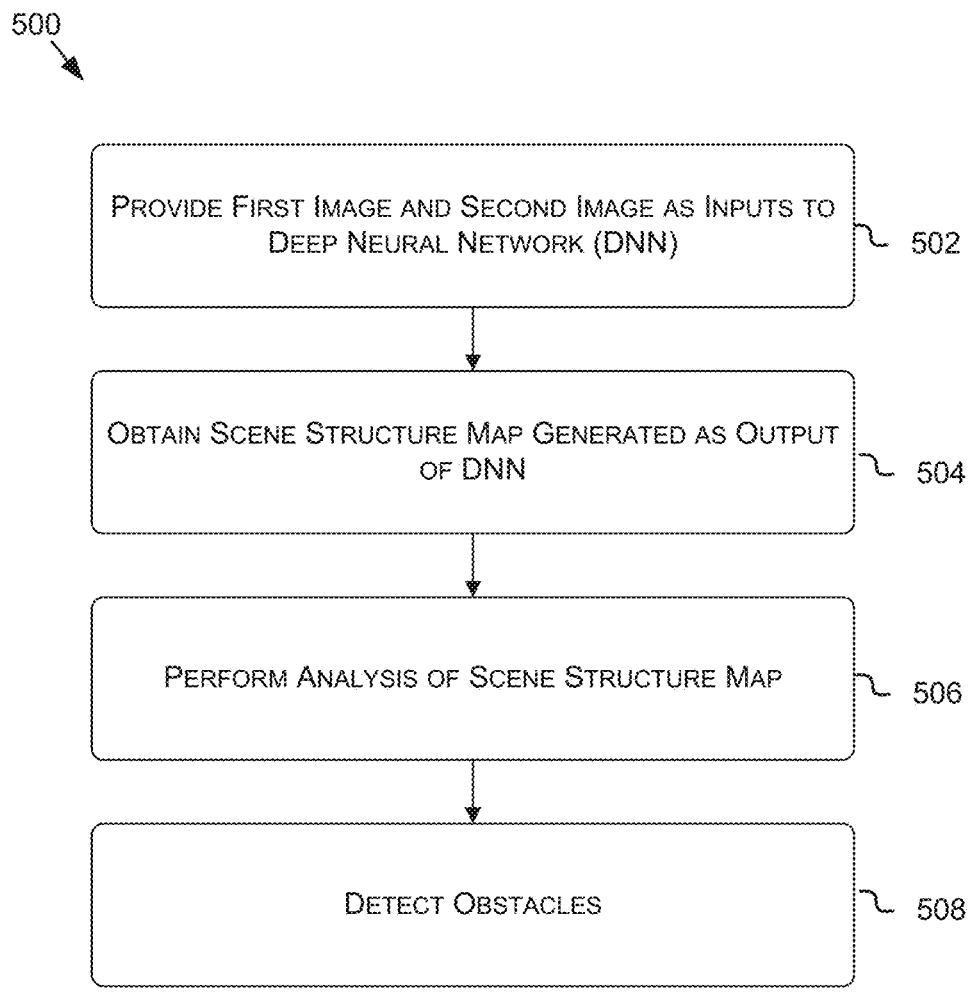
FIG. 5 is an example process of using a trained model for detecting objects by the example single camera system of FIG. 1, in accordance with some embodiments of the present disclosure.

FIG. 5 is a flow diagram showing a method 500 for a deployment phase of a trained DNN, in accordance with some embodiments of the present disclosure. The method 500, at block 502, includes providing a first image and a second image to a trained DNN as inputs. At block 504, the system executing method 500 obtains a scene structure map generated as an output of the DNN. As described in the present disclosure, the DNN takes images as inputs and outputs a scene structure map that indicates a predicted height above a road surface for objects within a scene.

At block 506 the system executing method 500 performs an analysis of the scene structure map. In various embodiments, the scene structure map includes a ratio of height and depth at each pixel within a scene as predicted by the DNN. In such embodiments, any non-zero value for a pixel may represent an object or portion thereof above the road surface. Pixels with a zero value may indicate that there is nothing on the road surface. Therefore, analysis of the scene structure map, in an embodiment, includes masking out pixels that do not represent an object on the road surface. Various techniques for focusing on the non-zero values included in the scene structure map may be used in connection with the embodiments described in the present disclosure.

At block 508 the system executing method 500 may detect obstacles on the road surface. For example, by at least performing blob detection and/or connection component analysis on the non-zero pixels indicated in the scene structure map. According to one or more further embodiments, the implementation of a two-image input may be extended to a multi-image input, such that the temporal information embedded in the volumetric video data may be used to improve results. Instead of using a single camera, multiple cameras such as stereo cameras may be leveraged. The disparity of overlapping scenes between different cameras can complement the information carried by a single camera with a scene captured at different times. Technical details, such as the photometric loss functions used in training a neural network (e.g., the DNN), can be extended to different volumetric data inputs (e.g., stereo cameras). For example, to compute the similarity between a warped image and a reference image, we can use L1 loss, L2 loss, Structural SIMilarity (SSIM) loss, or other suitable techniques. When multi-modal data is available, the neural network can be modified to take more inputs. For example, when radar/lidar data are available, this information can be used in conjunction with camera images to predict the scene structure map.

Figure 6:
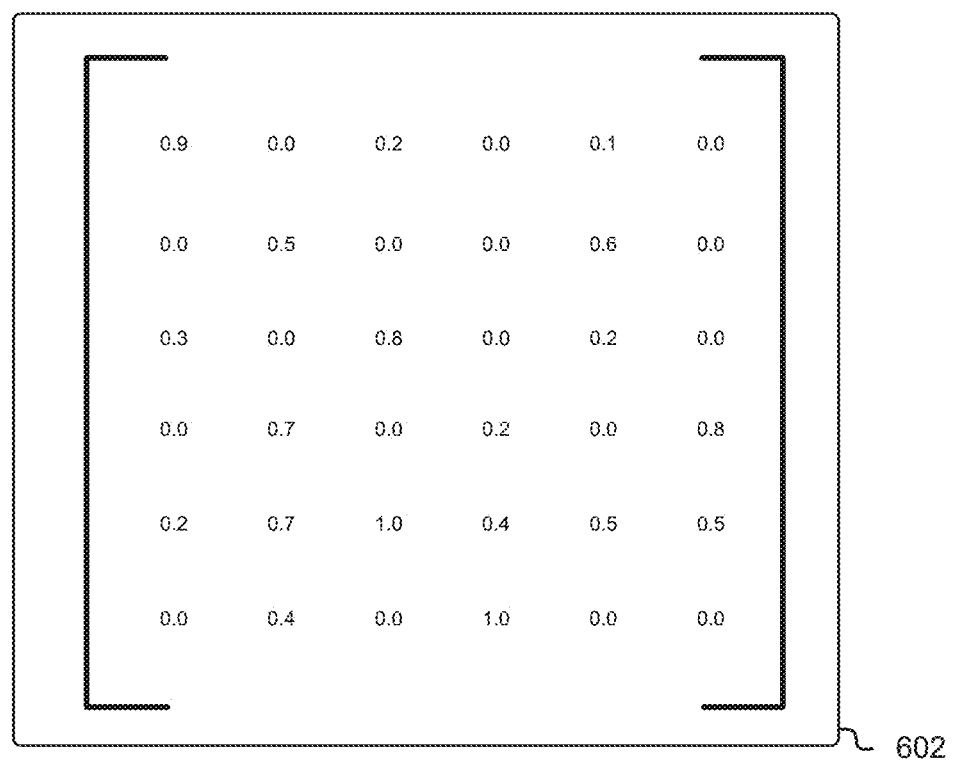
FIG. 6 is an example scene structure map generated by the trained model, in accordance with some embodiments of the present disclosure.

FIG. 6 illustrates an example output or scene structure map 602 generated based at least in part on two images provided as an input to a DNN. In various embodiments, the output of the DNN is a single scene structure map 602. Furthermore, the scene structure map 602 may have the same size as the input images, or reduced size, depending on accuracy and efficiency. For example, at the current timestamp in which the DNN is used to predict the scene structure, the DNN takes the current frame as an input, as well as one or more previous frames as inputs (e.g., 640×480 RGB color images captured from a single camera), and executes the inference. As a result, the scene structure map 602 of size 640×480 is outputted such that at various pixel locations, the value of the scene structure map 602 indicates the ratio between height and depth. As described above, the scene structure map may also have reduced output size, e.g., 320×240; in this case the resolution will be coarser, meaning that now in the map, one pixel will tell height/depth information corresponding to four pixels in the original image. In various embodiments, the reduced size of the scene structure map may increase efficiency.

Figure 7A:
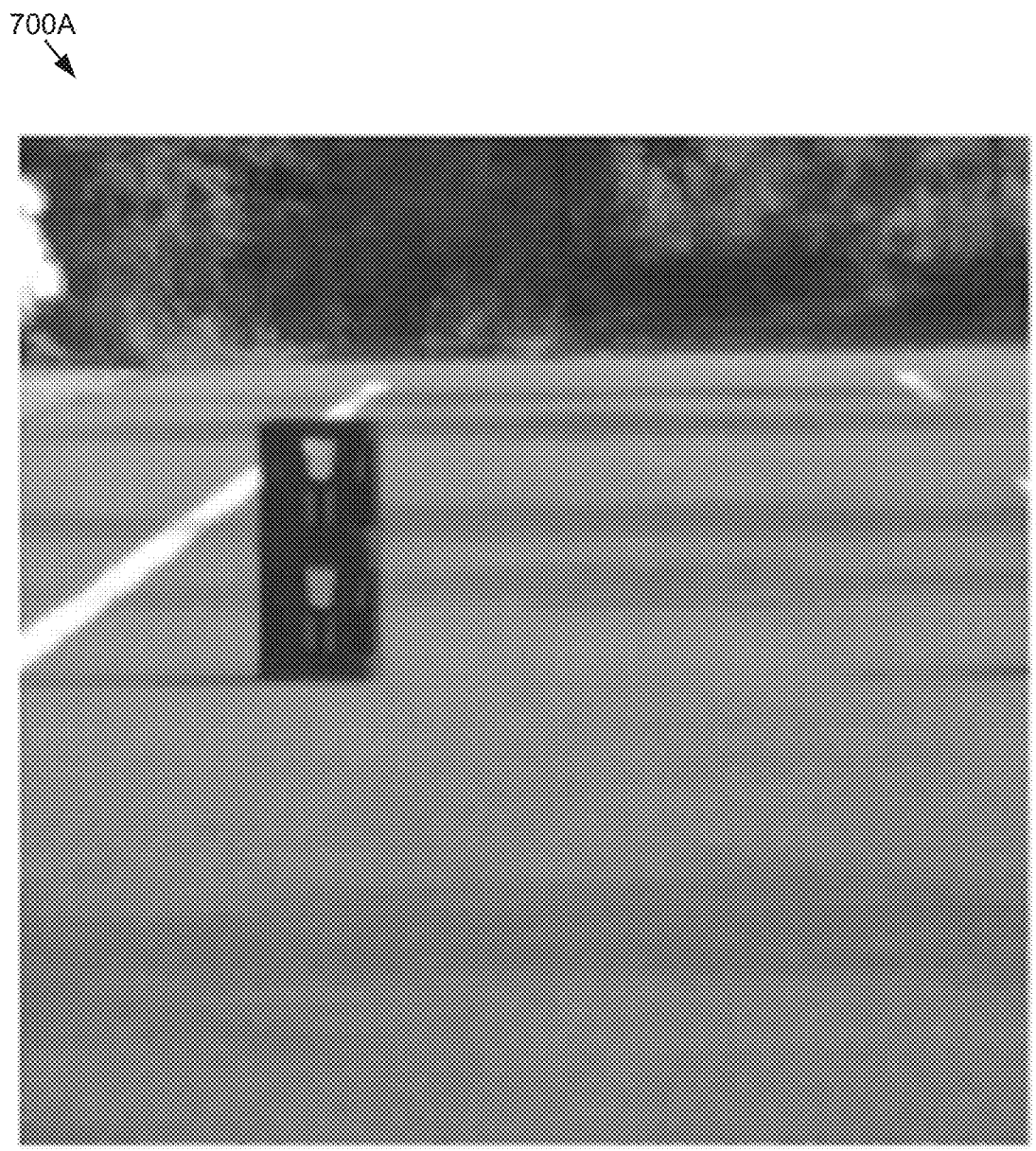
FIG. 7A is an example of an input image for a trained DNN, in accordance with some embodiments of the present disclosure.
Figure 7B:
FIG. 7B is an example scene structure map generated by the trained model, in accordance with some embodiments of the present disclosure.

FIG. 7A depicts an example input image 700A of a box in a road scene. The input image 700A, in various embodiments, is captured by a front-facing camera of a moving vehicle as described above. FIG. 7B depicts an example output scene structure map of the box depicted in image 700A. The example output scene structure map, in various embodiments, is generated by a trained DNN, as described above, which is provided as an input of the image 700A and at least one other image.

Figure 8A:
FIG. 8A is an example of an input image for a trained DNN, in accordance with some embodiments of the present disclosure.
Figure 8B:
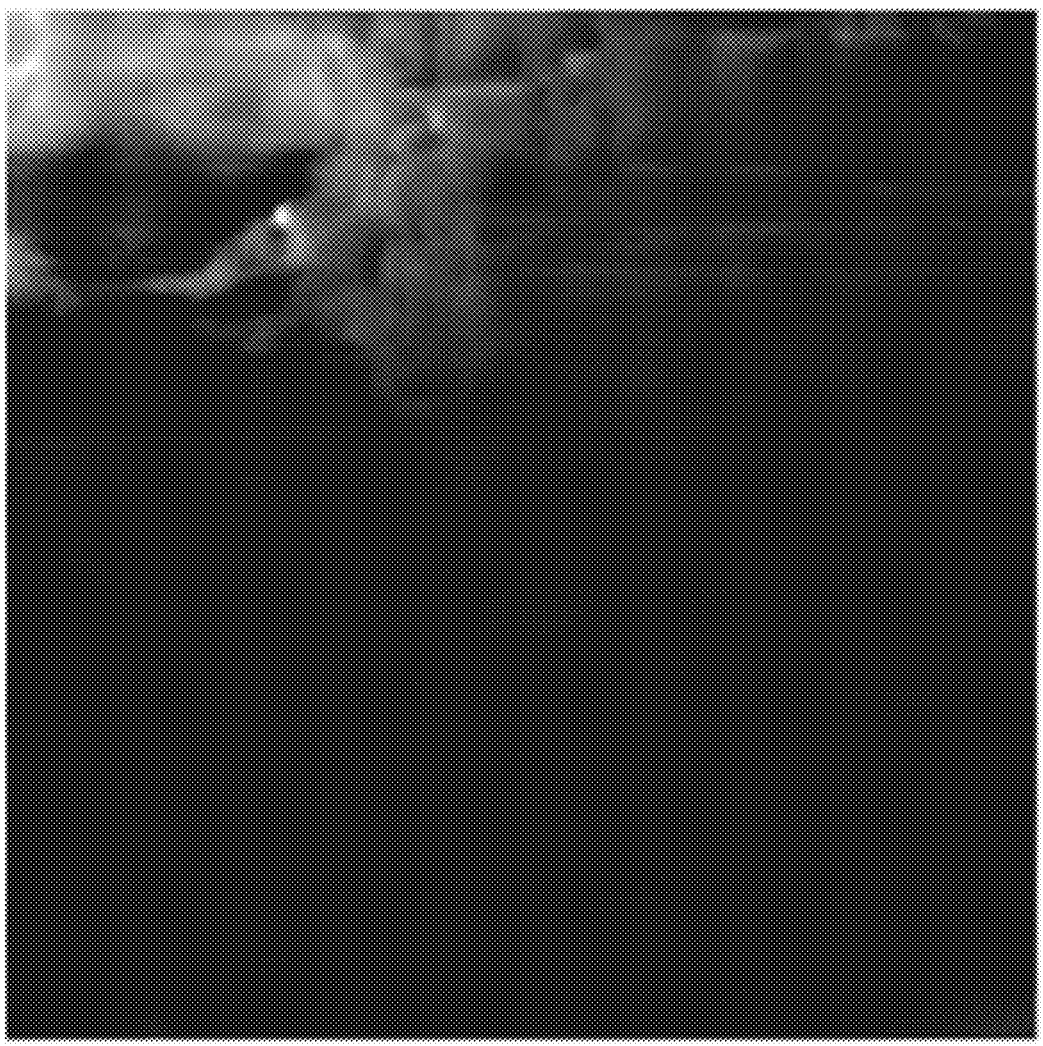
FIG. 8B is an example scene structure map generated by the trained model, in accordance with some embodiments of the present disclosure.

FIG. 8A depicts an example input image 800A of a vehicle in a road scene. The input image 800A, in various embodiments, is captured by a front-facing camera of a moving vehicle as described above. FIG. 8B depicts an example output scene structure map of the vehicle depicted in image 800A. The example output scene structure map, in various embodiments, is generated by a trained DNN, as described above, which is provided as an input of the image 800A and at least one other image.

Figure 9A:
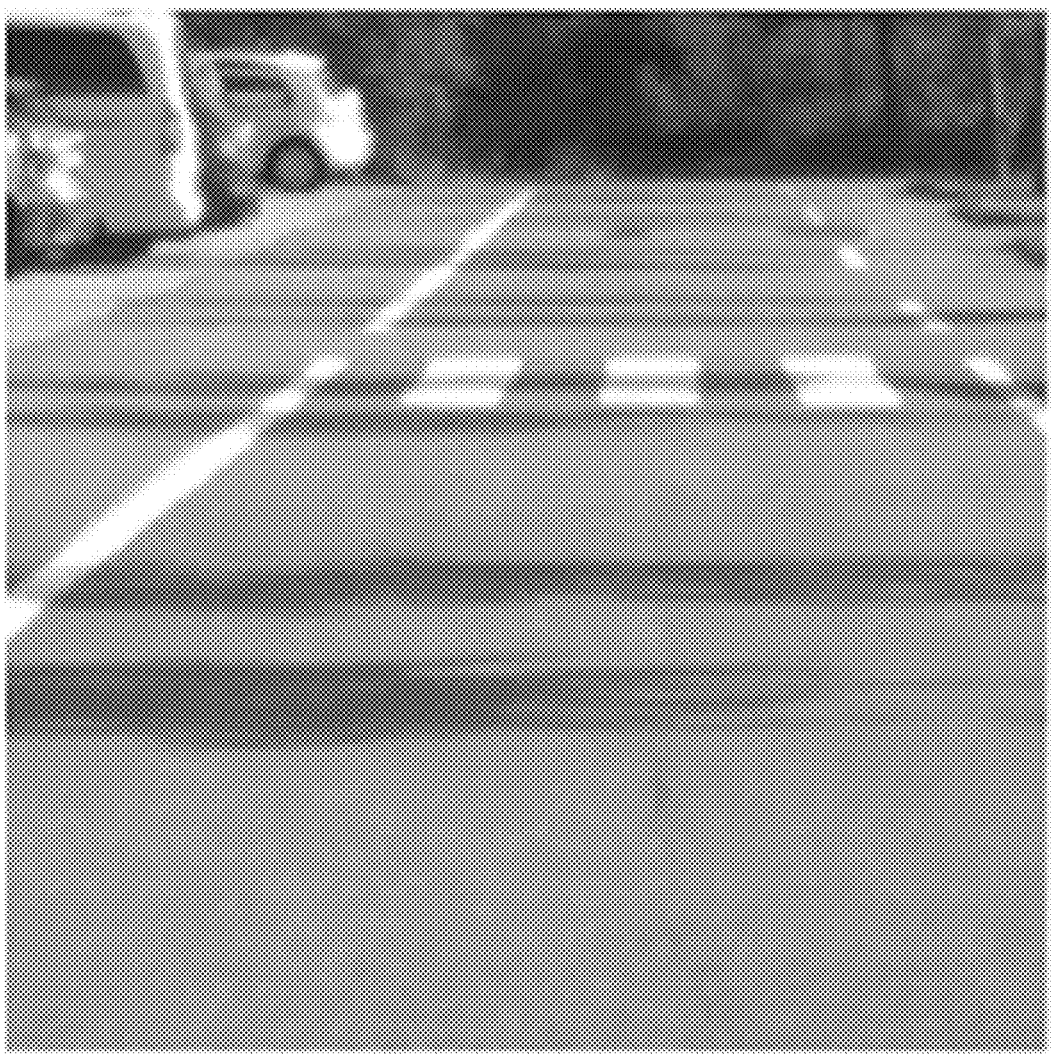
FIG. 9A is an example of an input image for a trained DNN, in accordance with some embodiments of the present disclosure.
Figure 9B:
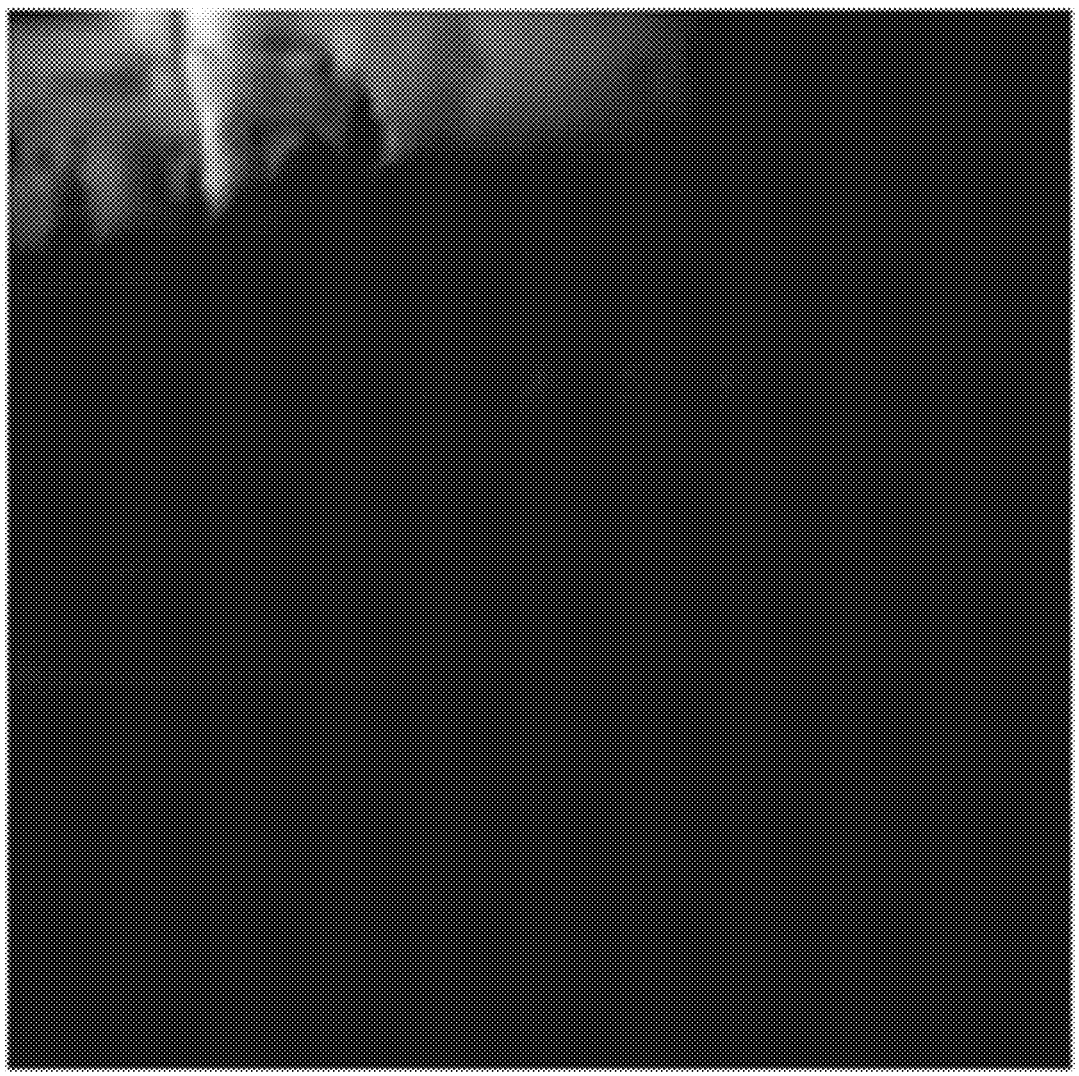
FIG. 9B is an example scene structure map generated by the trained model, in accordance with some embodiments of the present disclosure.

FIG. 9A depicts an example input image 900A of two-dimensional road markings in a road scene. The input image 900A, in various embodiments, is captured by a front-facing camera of a moving vehicle as described above. FIG. 9B depicts an example output scene structure map of the two-dimensional road markings depicted in image 900A. The example output scene structure map, in various embodiments, is generated by a trained DNN, as described above, which is provided as an input of the image 900A and at least one other image.

Example Autonomous Vehicle

Figure 10:
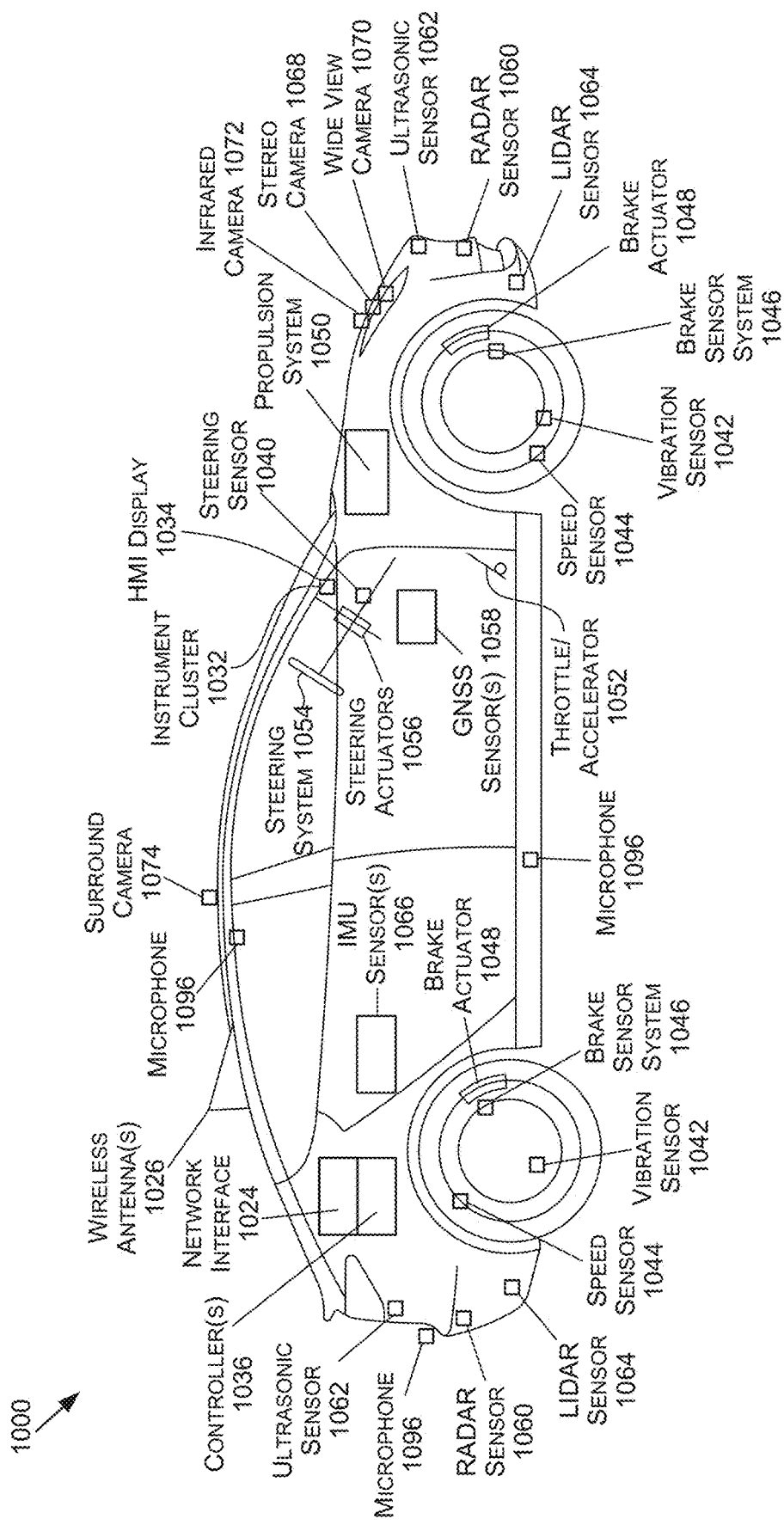
FIG. 10 is an illustration of an example autonomous vehicle, in accordance with some embodiments of the present disclosure.

FIG. 10 is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the U.S. Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more CPU(s), system on chips (SoCs) 1004 (FIG. 12) and/or GPU(s), may provide signals (e.g., representative of commands) to one or more components and/or systems of the vehicle 1000. For example, the controller(s) 1036 may send signals to operate the vehicle brakes via one or more brake actuators 1048, to operate the steering system 1054 via one or more steering actuators 1056, and/or to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) 1046 (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 12), location data (e.g., the location of the vehicle 1000, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024, which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 11:
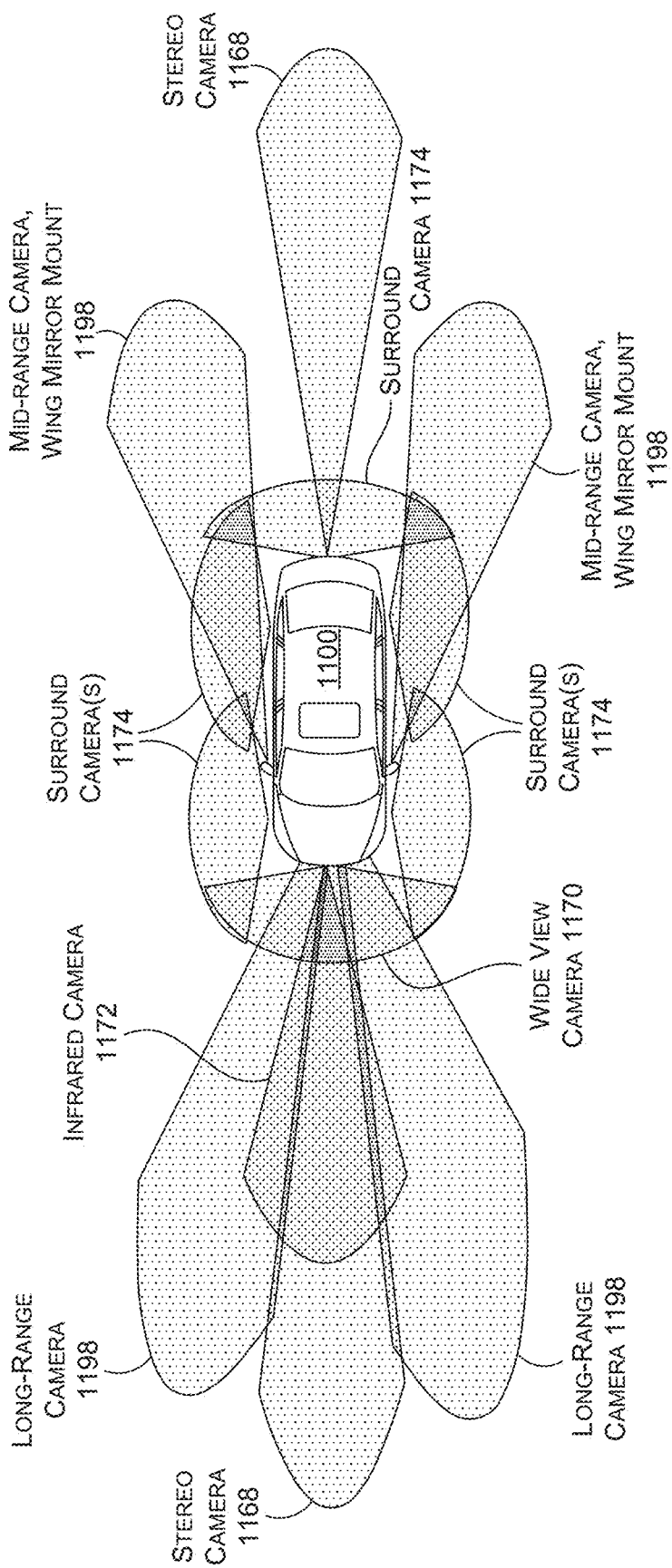
FIG. 11 is an example of camera locations and fields of view for the example autonomous vehicle of FIG. 10, in accordance with some embodiments of the present disclosure.

FIG. 11 is an example of camera locations and fields of view for the example autonomous vehicle 1000 of FIG. 10, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wingmirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1100 (e.g., front-facing cameras) may be used for surround view, to help identify forward-facing paths and obstacles, as well as aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11, there may be any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that includes portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11) may be positioned around the vehicle 1100. The surround camera(s) 1174 may include wide-view camera(s) 1170, fisheye camera(s), 360-degree camera(s), and/or the like. For example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround-view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 12:
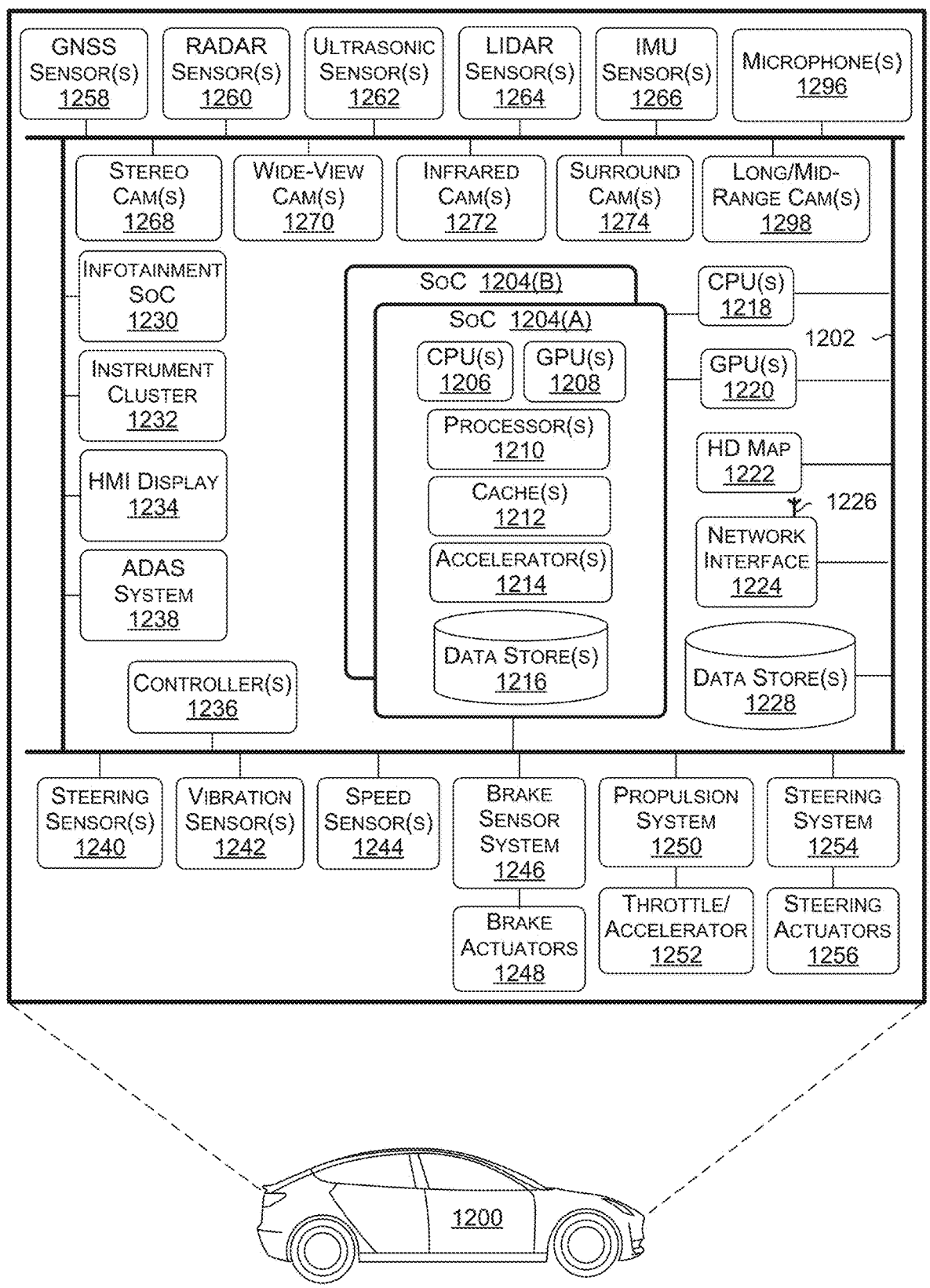
FIG. 12 is a block diagram of an example system architecture for the example autonomous vehicle of FIG. 10, in accordance with some embodiments of the present disclosure.

FIG. 12 is a block diagram of an example system architecture for the example autonomous vehicle 1000 of FIG. 10, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12 is illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 10. The controller(s) 1236 may be used for a variety of functions. The controller(s) 1236 may be coupled to any of the various other components and systems of the vehicle 1200 and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1378 of FIG. 13).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use computer-based application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting, and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to the memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected to both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))— or other math coprocessor or numeric coprocessor types— for performing mathematical operations within the system.

For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3-D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1216 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe-stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and actively performing 3-D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always-on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, which use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include an SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228, which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258 (e.g., GPS and/or assisted GPS sensors), to assist in mapping, perception, occupancy grid generation, and/or path planning functions. Any number of GNSS sensor(s) 1258 may be used, including, for example and without limitation, a GPS using a USB connector with an Ethernet to serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data, in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1200 at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 100 m, with an accuracy of 2 cm-3 cm, and with support for a 100 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10 and FIG. 11.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include an SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjusts the vehicle speed to maintain a safe distance from vehicles ahead. Lateral ACC performs distance keeping, and advises the vehicle 1200 to change lanes when necessary. Lateral ACC is related to other ADAS applications such as LC and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1200), while the I2V communication concept provides information about traffic farther ahead. CACC systems may include either or both I2V and V2V information sources. Given the information of the vehicles ahead of the vehicle 1200, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network that is trained and thus reduces the risk of false positives, as described herein.

The vehicle 1200 may further include the infotainment SoC 1230 (e.g., an in-vehicle infotainment system (IVI)). Although illustrated and described as an SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1200. For example, the infotainment SoC 1230 may include radios, disk players, navigation systems, video players, USB and Bluetooth connectivity, carputers, in-car entertainment, Wi-Fi, steering wheel audio controls, hands-free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe-stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 13:
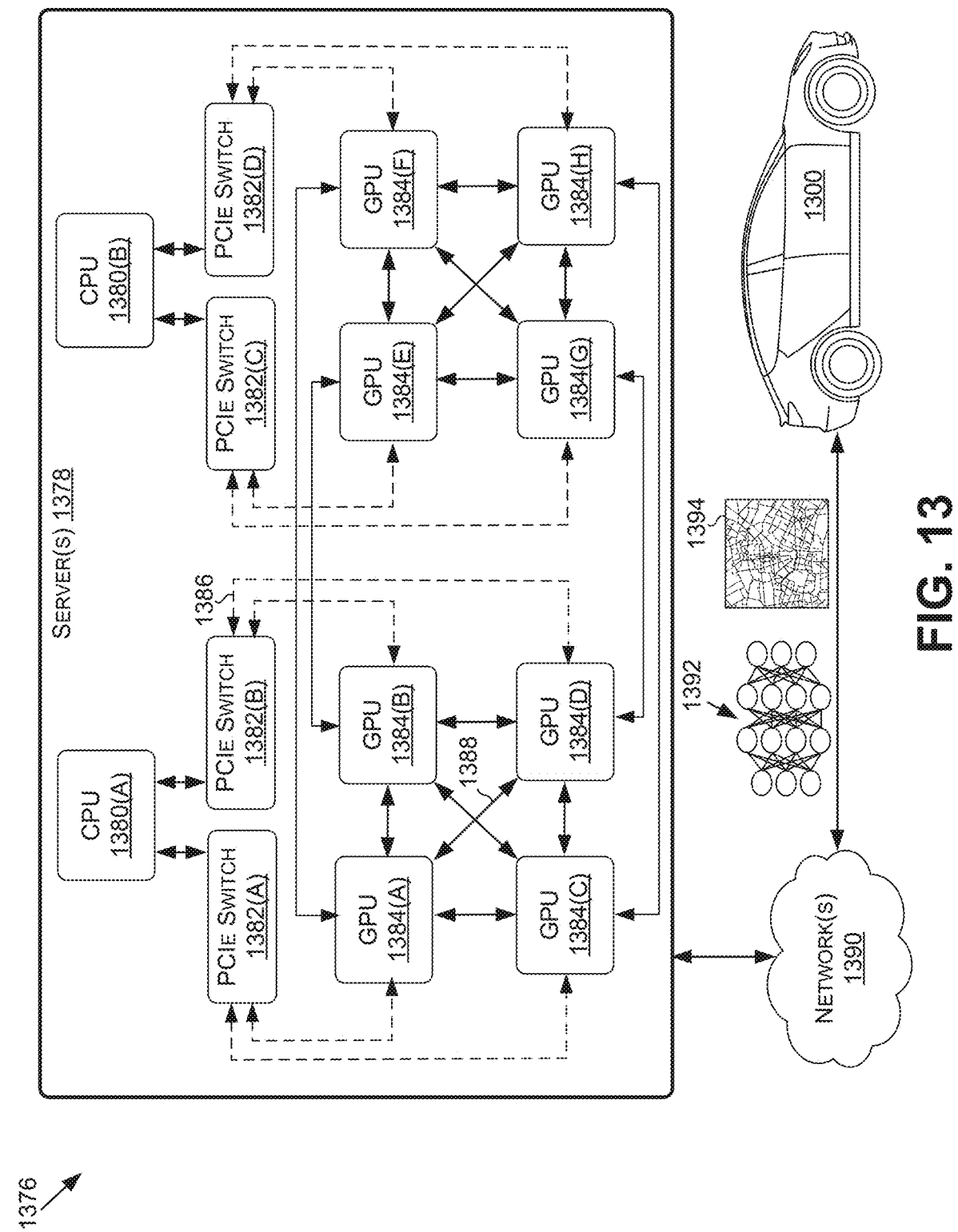
FIG. 13 is a system diagram for communication between cloud-based server(s) and the example autonomous vehicle of FIG. 10, in accordance with some embodiments of the present disclosure.

FIG. 13 is a system diagram for communication between cloud-based server(s) and the example autonomous vehicle 1000 of FIG. 10, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced roadwork. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPUpowered servers and inference acceleration may make real-time responsiveness possible. In other examples, such as where performance is less critical, servers powered by CPUs, FPGAs, and other processors may be used for inferencing.

Example Computing Device

Figure 14:
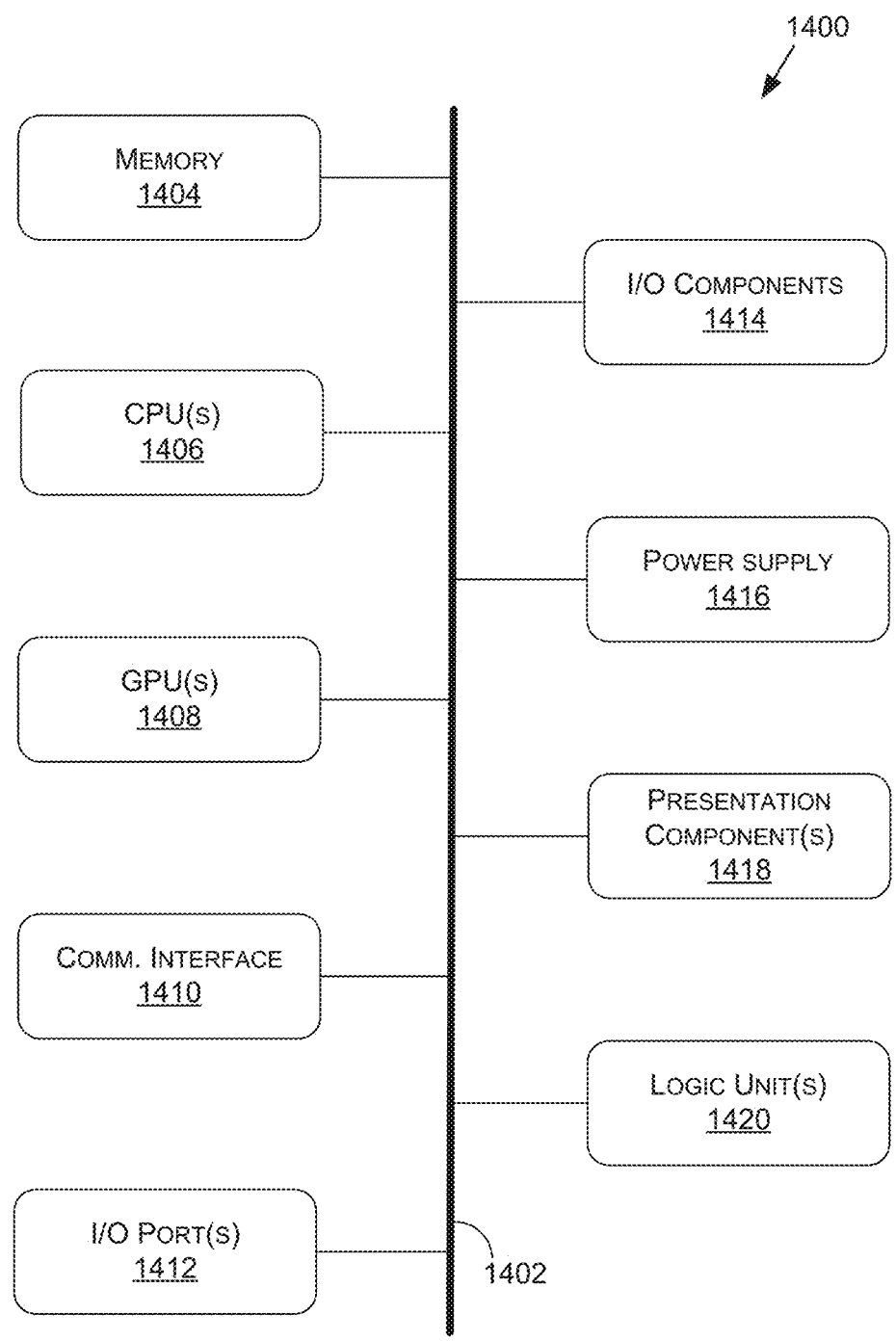
FIG. 14 is a block diagram of an example computing device suitable for use in implementing some embodiments of the present disclosure.

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, I/O ports 1412, input/output components 1414, a power supply 1416, one or more presentation components 1418 (e.g., display(s)), and one or more logic units 1420.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point, connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406) and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In some embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, including wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1412 may enable the computing device 1400 to be logically coupled to other devices including the I/O components 1414, the presentation component(s) 1418, and/or other components, some of which may be built into (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processors; and
   memory storing instructions that, as a result of being executed by the one or more processors, cause the system to:
   capture a first image and a second image, the first image captured at a first time from a first location of a scene and the second image captured at a second time from a second location of the scene;
   generate, using a neural network and based on the first image and the second image, a scene structure map being representative of a planar homography estimation corresponding to one or more surfaces in the scene; and
   detect an object in the scene based at least in part on generating a bounding box that comprises a subset of values from a set of values of the scene structure map, wherein the subset of values indicate a region of non-zero values.

2. The system of claim 1, wherein the memory further includes instructions that, as a result of being executed by the one or more processors, cause the system to:
   determine the planar homography estimation to warp the first image to the second image based at least in part on a set of key points extracted from the first image and the second image; and
   generate a first warped image by at least warping the first image to the second image based at least in part on the planar homography estimation.

3. The system of claim 2, wherein the memory further includes instructions that, as a result of being executed by the one or more processors, cause the system to:
   determine a residual flow based at least in part on the first warped image and the scene structure map, where the residual flow is used to transform the first warped image to the second image by at least modeling a transformation of the subset of values of the scene structure map to corresponding pixels in the second image; and
   generate a second warped image based at least in part on the first warped image, the scene structure map, and the residual flow.

4. The system claim 3, wherein the memory further includes instructions that, as a result of being executed by the one or more processors, cause the system to:
   determine a photometric difference between the second warped image and the second image; and
   modify a parameter of the neural network based at least in part on the photometric difference.

5. The system of claim 1, wherein the first image and the second image are captured from a single camera.

6. The system of claim 1, wherein the instructions that cause the system to detect the object in the scene further include instructions that, as a result of being executed by the one or more processors, cause the system to generate the bounding box based, at least in part, on dilation or erosion.

7. The system of claim 1, wherein the instructions that cause the system to detect the object in the scene further include instructions that, as a result of being executed by the one or more processors, cause the system to perform connected component analysis on pixel locations of the first image and the second image corresponding to pixel locations associated with the subset of values.

8. The system of claim 1, wherein at least one surface of the one or more surfaces is a plane.

9. A computer-implemented method comprising:
   training a deep neural network (DNN) by at least:
   obtaining a first image captured during a first interval of time and a second image captured during a second interval of time;
   generating a first warped image by at least warping the first image towards the second image based at least in part on a planar homography;
   determining a residual flow based at least in part on the first warped image and a scene structure map generated by at least providing the DNN the first image and the second image as inputs, where the scene structure map includes a ratio of height and depth for a particular pixel within the first image and the second image;
   generating a second warped image based at least in part on the first warped image and the residual flow;
   calculating a photometric loss between the first image and the second warped image; and
   modifying a parameter of the DNN based at least in part on the photometric loss.

10. The computer-implemented method of claim 9, wherein the method further comprises:
    obtaining a third image captured during a third interval of time and a fourth image captured during a fourth interval of time;
    generating a second scene structure map by at least providing the third image and the fourth image as inputs to the DNN; and
    detecting an obstacle within the second scene structure map based at least in part on a set of non-zero values associated with a set of pixels represented within the second scene structure map.

11. The computer-implemented method of claim 10, wherein the method further comprises determining the planar homography by at least determining a set of keypoints in the first image and the second image based at least in part on a set of matched features obtained by at least performing feature matching between the first image and the second image.

12. The computer-implemented method of claim 10, wherein the second scene structure map indicates a height above a surface plane corresponding to part of a road surface.

13. The computer-implemented method of claim 9, wherein the first image and the second image are captured consecutively.

14. The computer-implemented method of claim 9, wherein the first image and the second image are captured from a single monocular camera.

15. A method of detecting an obstacle, comprising detecting the obstacle using a neural network trained according to the method of claim 9.

16. An autonomous vehicle comprising a system to detect an obstacle using a neural network trained by the system of claim 9.

17. A system comprising:
one or more processors; and
memory storing instructions that, as a result of being executed by the one or more processors, cause the system to:
  obtain a first image of a scene and a second image of the scene, the first image and the second image having been captured from different locations;
  generate a transformed first image by at least transforming the first image toward the second image based at least in part on a set of features obtained from the first image and the second image;
  use a neural network to generate, based on the first image and the second image, a map that associates a ratio of height and depth with corresponding locations in the scene;
  use a residual flow to transform the transformed first image further toward the second image to generate a further transformed image; and
  update the neural network based on a measurement of a difference between the further transformed image and the second image.

18. The system of claim 17, wherein the first image and the second image are non-consecutive images captured by a camera over an interval of time.

19. The system of claim 18, wherein the camera is mounted within a vehicle facing forward.

20. The system of claim 19, wherein the memory further includes instructions that, as a result of being executed by the one or more processors, cause the system to modify a sampling rate of a set of images based at least in part on a velocity associated with the vehicle, where the first image and the second image are members of the set of images.

21. The system of claim 19, wherein the memory further includes instructions that, as a result of being executed by the one or more processors, cause the system to modify a sampling rate of a set of images based at least in part on a steering wheel angle associated with the vehicle, where the first image and the second image are members of the set of images.

22. The system of claim 17, wherein the instructions that cause the system to generate the transformed first image further include instructions that, as a result of being executed by the one or more processors, cause the system to estimate a homography transformation based at least in part on a first subset of features of the set of features obtained from a first region of the first image and a second subset of features of the set of features obtained from a second region of the second image.

23. The system of claim 17, wherein the memory further includes instructions that cause the system to extract the set of features by at least providing the first image and the second image as inputs to a consensus-based algorithm.

24. The system of claim 17, wherein the map further comprises a set of values, where a first value of the set of values includes a ratio of height and depth of a pixel location within the first image.

* * * * *